March 14, 1967 E. H. IRASEK 3,308,830

RANDOM ACCESS DATA-STORAGE SYSTEM

Filed Dec. 11, 1963 3 Sheets-Sheet 1

Inventor
Eugene H. Irasek

By Louis A. Kline
John J. Matlago
Nathan Cass
His Attorneys

RANDOM ACCESS DATA-STORAGE SYSTEM

Filed Dec. 11, 1963 3 Sheets-Sheet 2

Inventor
Eugene H. Irasek

By Louis A. Kline
John J. Matlago
Nathan Cass
His Attorneys.

March 14, 1967 E. H. IRASEK 3,308,830
RANDOM ACCESS DATA-STORAGE SYSTEM
Filed Dec. 11, 1963 3 Sheets-Sheet 3

Projections 68 all the way in
(Card selection period)

Card part way out

Card all the way out & falling

Card being returned to bottom of stack

Inventor
Eugene H. Irasek
By Louis A Kline
John J. Matlago
Nathan Cass
His Attorneys United States Patent Office 3,308,830

Patented Mar. 14, 1967

3,308,830

RANDOM ACCESS DATA-STORAGE SYSTEM

Eugene H. Irasek, Pacoima, Calif., assignor to The National Cash Register Company, Dayton, Ohio, a corporation of Maryland Filed Dec. 11, 1963, Ser. No. 329,762

16 Claims. (Cl. 129—16.1)

This invention relates generally to devices for handling individual elements such as cards, and more particularly to a high capacity, rapidly accessible random access data-storage device for use in a computer system.

The advantages to be derived from a high capacity, rapidly accessible random access data-storage device for use in a computer system are so numerous and well recognized as to require little elaboration. However, in spite of the acknowledged advantages to be gained from the use of such a random access data-storage device, progress towards the development of a practical device has been quite slow and the art has been beset by a variety of problems.

One of the more promising approaches which has been taken towards the development of a random access data-storage system has involved the use of discrete individual data-storage elements, such as cards. In such an approach, the cards are arranged in one or more assembled groups, and selection means are provided for causing a selected card to be randomly separated from the group, regardless of its position therein. The separated card is then fed to a transducing means for a transducing operation, after which the card is automatically returned to the group. While such an approach employing individual cards has important advantages, many problems have arisen in attempting to provide a practical system. One such problem is involved in obtaining rapid and reliable access of selected cards without excessive card wear. A second problem is involved in providing a rapid and reliable way of automatically returning a separated card to its group. It is towards the solution of these two problems that the present invention is primarily directed.

Accordingly, it is a broad object of the present invention to provide improved individual element handling devices.

Another object of the invention is to provide an improved high capacity, rapidly accessible random access data-storage system.

More specifically, it is a further object of the present invention to provide a high capacity, rapidly accessible random access data-storage system of the type employing individual data cards wherein a selected card may be rapidly removed from its assembled group, regardless of its position therein, and following a transducing operation, automatically returned to its group, all without excessive card wear and with a minimum of required mechanical structure.

Briefly, in a typical embodiment of the invention, at least one assembled group of cards is disposed for rotation in a manner so that, when a selected card in the group is released for movement, the rotational centrifugal force acting on the card will be sufficient to separate the card from the group without any mechanical pulling or pushing of the card. In addition, a unique variable-radius card control means rotating with the group of cards provides full control of a selected card not only during the time it is being separated from the group, but also, while the selected card is traversing the transducing means. This same card-control means further serves to automatically return the selected card back to its group following a transducing operation.

The specific nature of the present invention as well as other objects, uses, and advantages thereof will become apparent from the following description of a typical embodiment of the invention illustrated in the accompanying drawings in which.

Like numerals designate like elements throughout the figures of the drawings.

Figure 1:
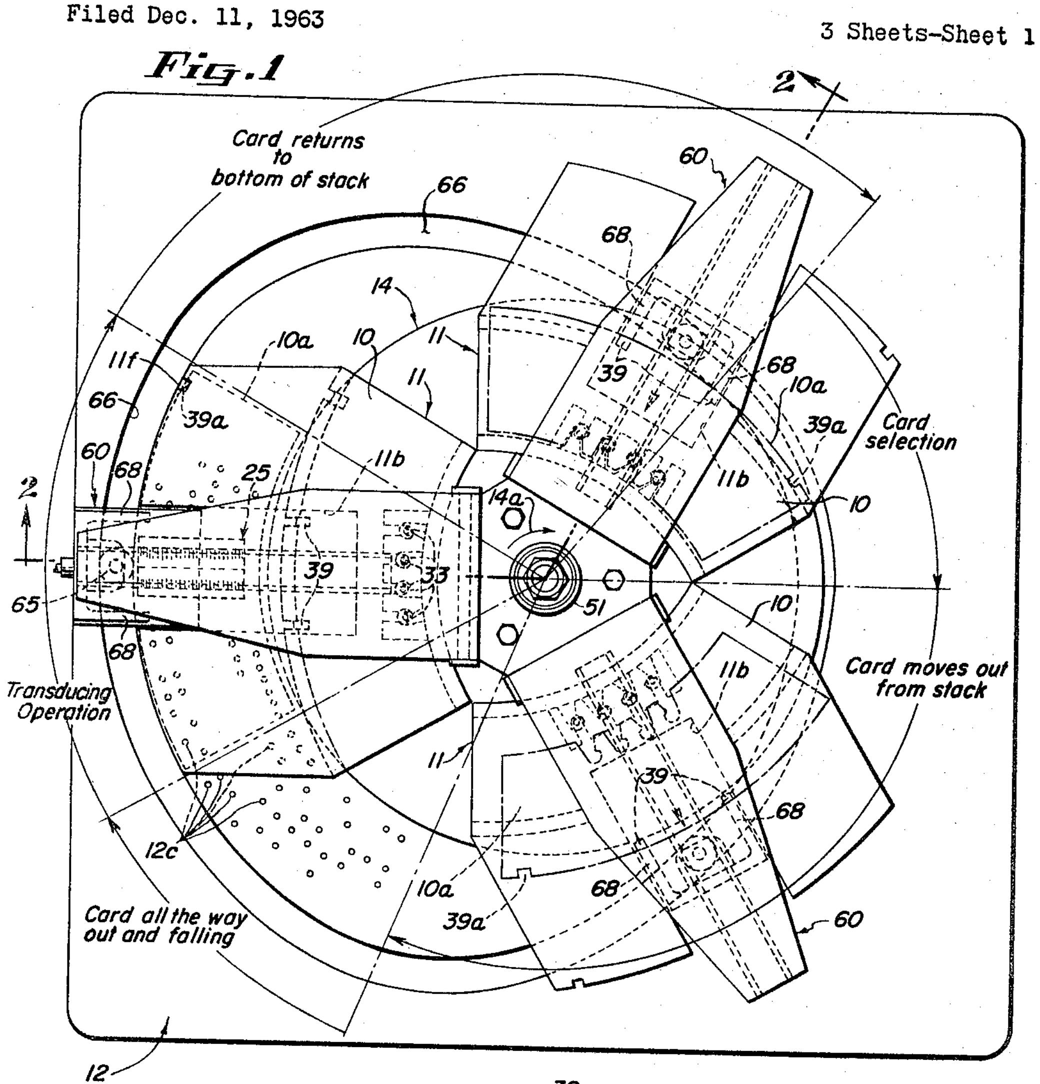
FIG. 1 is a plan view of a typical embodiment of the invention.
Figure 2:
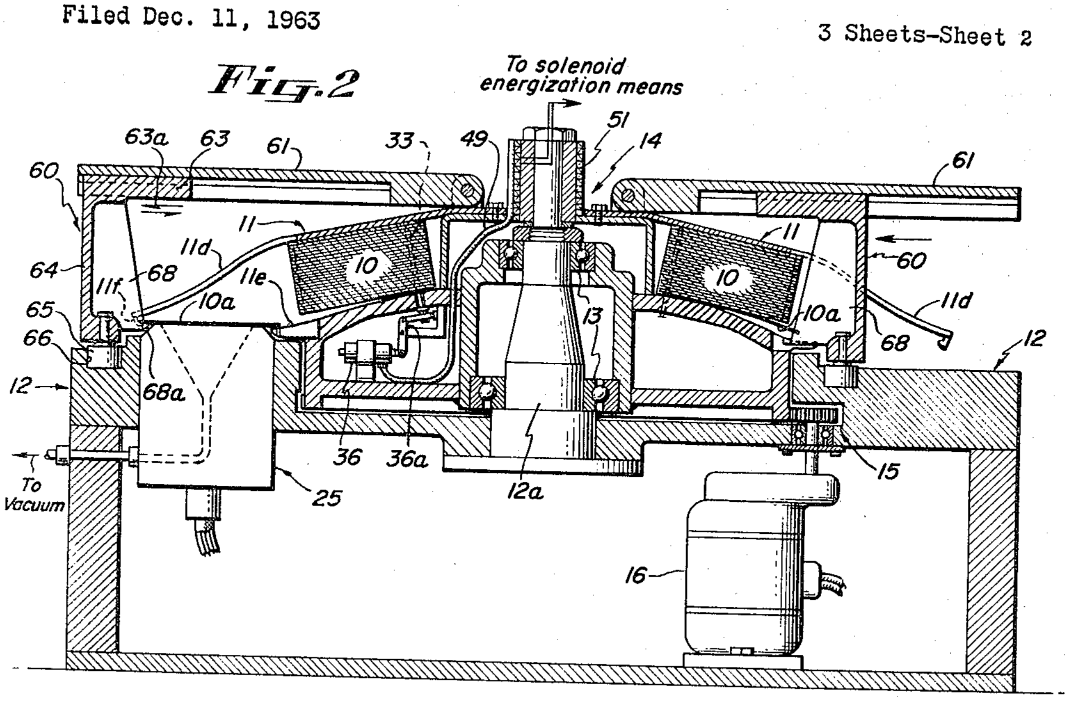
FIG. 2 is a cross-sectional view taken along the line 2—2 in FIG. 1.
Figure 5:
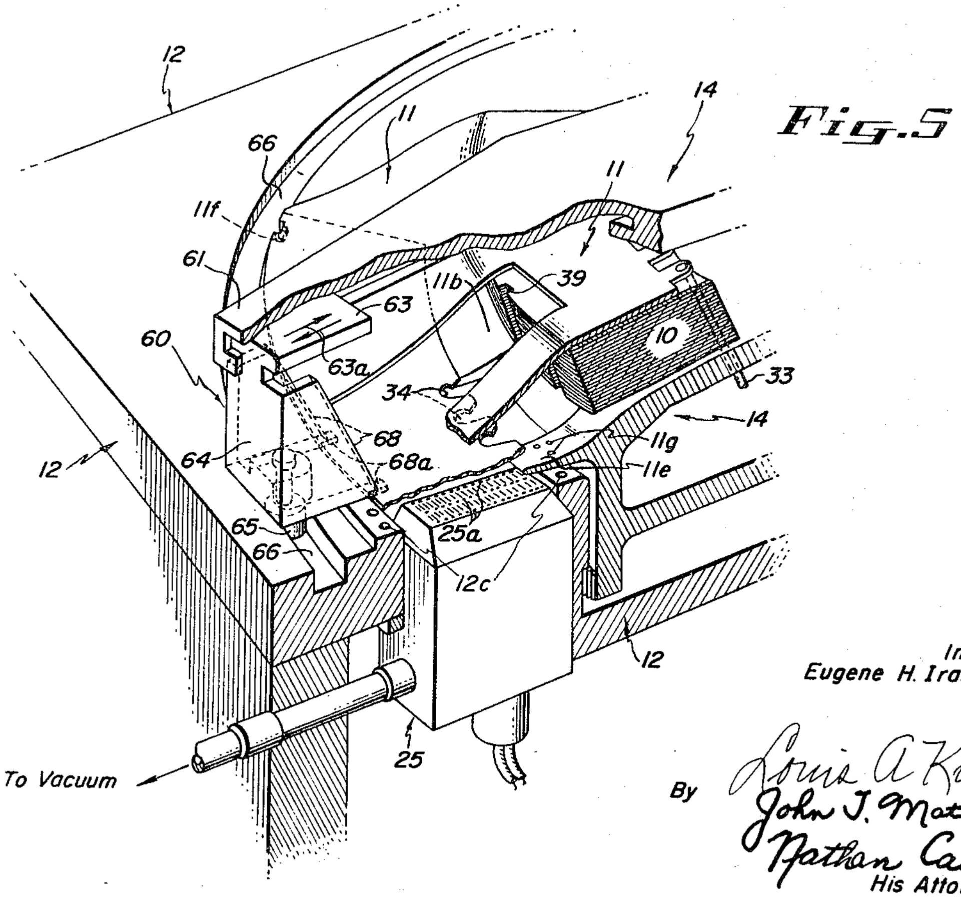
FIG. 5 is a fragmentary perspective view of FIGS. 1 and 2, with parts broken away, taken in the vicinity of the transducing means.

Referring to the drawings and most particularly to FIGS. 1, 2 and 5, thereof, a random access device in accordance with the invention is illustrated. The device basically comprises two parts: a fixed base structure 12 containing a transducing head 25, and a rotating assembly 14 containing three stacks of symmetrically spaced data-storage cards 10 (which may be of the magnetic type), rotation being in the direction indicated in FIG. 1 by the arrow 14*a*. As best shown in FIG. 2, the rotating assembly 14 is disposed for rotation about a shaft 12*a* of the fixed base structure 12 by means of bearings 13, and is caused to rotate by suitable means such as a gear driving arrangement 15 driven by a motor 16.

Briefly, operation of the device illustrated in the drawings is such that, during each revolution of the rotating assembly 14, a card is selectively released from each stack 10, separated from the stack by centrifugal force, guided over the transducing head 25, and then automatically returned to the stack from whence it came. The specific manner in which these operations are accomplished will become evident as the description progresses.

Figure 3:
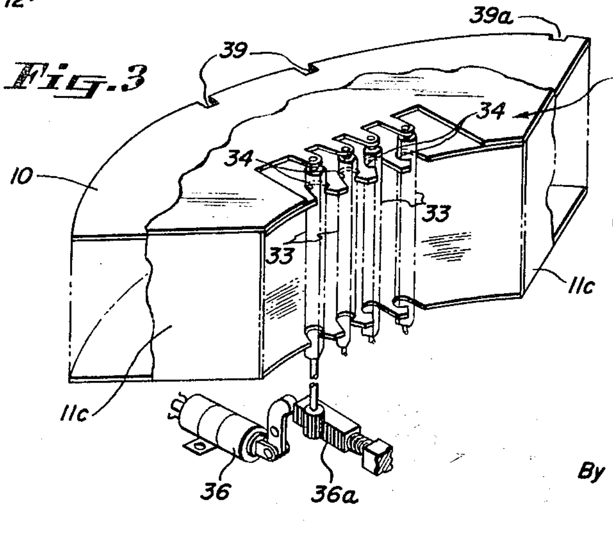
FIG. 3 is a fragmentary perspective view of one of the three rotating magazines in FIG. 1 showing how a stack of cards is retained in the magazine by selectively rotatable selector rods cooperating with coded notches provided on the cards.
Figure 4:
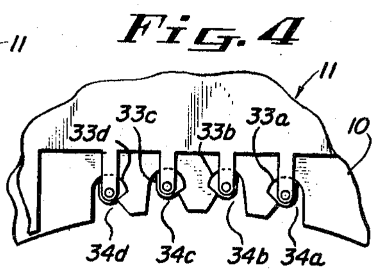
FIG. 4 is a fragmentary plan view of FIG. 3 showing a close-up of the coded notches in the cards and the selector rods cooperating therewith.

Each stack of cards 10 carried by the rotating assembly 14 is disposed within a magazine 11. Since all the magazines 11 and their respective cards are constructed and arranged similarly, only one need be considered. As shown in FIGS. 2 and 5, the cards in each magazine 11 slope downward in a direction away from the center of rotation, the angle being chosen to be optimum for separation of a selected card from the stack under the influence of the rotational centrifugal force. The cards are held in the magazine 11 at the long edge thereof closest to the center by solenoid-controlled selector rods 33 (FIGS. 3 and 4). These rods 33 are shaped to cooperate with coded notches 34 on the cards and, in response to selective energization of their respective solenoids 36 acting through a linear-to-rotational gear arrangement 36*a*, permit release of a selected card for movement with respect to the stack 10.

It will be assumed for exemplary purposes that each stack 10 contains sixteen cards. The cards are preferably sectorially shaped, and each card 10*a* contains a unique combination of four coded notches 34*a*, 34*b*, 34*c* and 34*d* (FIG. 4) provided in the long edge closest the center—that is, in the inner edge of the card. The coded notches 34 of the cards in the stack 10 are aligned with one another, and it is through these coded notches that the solenoid-controlled selector rods 33 are passed. The rods 33 are suitably supported at the top of the magazine 11 and have a sectorial cross-section shaped to cooperate with the notches 34 on the cards. Each selector rod 33 can reside in either of two positions, such as illustrated by rods 33*a* and 33*c* in FIG. 4. It will be understood, therefore, that for any given combinational position of the selector rods 33, only one card will be free to move out from the rods 33. The solenoids 36 are constructed and arranged in cooperation with their respective selector rods 33 so that, for each selection, the rods will retain their selected positions until the next selection occurs. Also, since the solenoids 36 as well as the selector rods 33 rotate with the rotating assembly 14, energization signals are applied thereto by way of an electrical cable 49 and a conventional slip ring assembly 51 (FIG. 2). Card selection arrangements of the type just described are well known in the art and may be provided in various other ways besides that shown herein without departing from the scope of this invention. The commonly assigned copending patent application Serial No. 12,032, filed March 1, 1960 and having the same inventor illustrates a typical arrangement.

So far, it has been explained how a card in a stack 10 may be selectively released from the selection rods 33. It will now be explained how such a released card is separated from its respective stack, carried to a magnetic transducing means for a transducing operation, and then automatically returned to the stack from which it came, all within one revolution of the rotating structure 14. Since there are three stacks 10, this will mean that three cards are accessed in this manner during each revolution. The various rotational period during which each of these operations occurs is appropriately marked in FIG. 1.

Still referring to FIGS. 1, 2 and 5, it will be seen that the rotating structure 14 additionally includes three card-control assemblies 60 affixed thereto for rotation therewith, one card-control assembly 60 being provided for each magazine 11. Each card-control assembly 60 includes a horizontal member 61 (as best seen in FIGS. 2 and 5), a cooperating member 63 radially slidable therein (as indicated by the arrows 63*a*), a vertical portion 64 integral with the slidable member 63 and depending perpendicularly therefrom, and a follower bearing 65 affixed to the lower end of portion 64 and riding in a groove 66 provided in the fixed base structure 12. It will be understood that, as the rotating structure 14 rotates, the follower 65 of each assembly 60 will follow the groove 66, while its respective slidable member 63 will radially slide in and out of its respective member 61 in accordance with the changing radius of the groove 66.

The manner in which each rotating card-control assembly 60 is used in controlling a selected card in its respective magazine 11 will now be explained with particular reference to FIGS. 6–9. Since each magazine 11 and assembly 60 operate in a similar manner, a description of one such pair will suffice.

Figure 6:
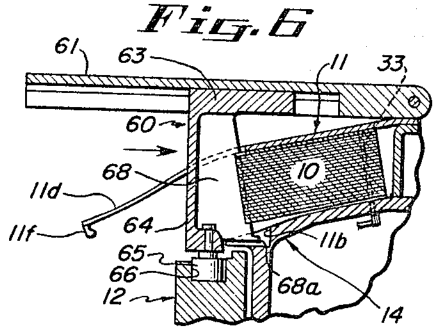
FIGS. 6–9 are fragmentary cross-sectional views taken at various rotational positions of a typical magazine and its associated card-control assembly.

In addition to the structure already considered, each card-control assembly 60 also includes two spaced sloping projections 68 depending inward from vertical portion 64 towards the center of rotation. These projections 68 are located in line with corresponding slots 39 (FIG. 3) provided in the outer edge of each card. At positions of minimum radius of the groove 66, the card-control assembly 60 will be closest to the center of rotation as illustrated in FIG. 6. The two projections 68, whose slope is at the same angle as the cards in the stack 10, will then engage the slots 39 of all of the cards of the stack 10 and thereby hold all of them firmly in position in the magazine 11, regardless of the combinational position of the selector rods 33. The upper and lower portions of the magazine 11 are suitably cut out as indicated by the openings 11*b* (FIGS. 1, 5 and 6) to permit the projections 68 to move therebetween.

The starting point for the operation occurring during each cycle may conveniently be taken as the beginning of the CARD SELECTION period (see FIG. 1) during which the radius of the groove 66 remains essentially constant at its innermost position, and the solenoids 36 are appropriately energized so as to move their respective selector rods 33 to a combination which will free a selected card therefrom. In order to permit energization of the solenoids 36 at the proper time in each revolution, the slip ring assembly 51 (FIG. 2) is suitably designed so that the solenoids 36 can be energized to change the positions of the selector rods 33 only during the CARD SELECTION period.

Figure 7:
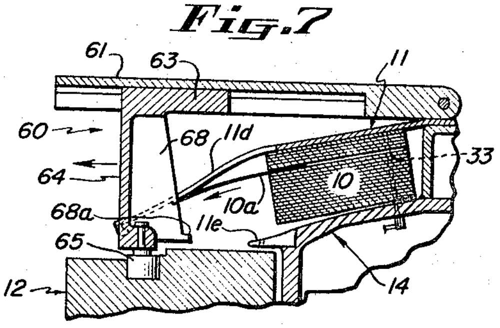
Figure 8:
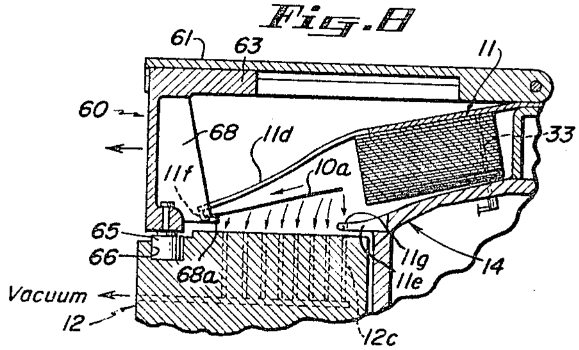

During the CARD MOVES OUT period (see FIG. 1) which follows next, the radius of the groove 66 increases fairly rapidly causing the projections 68 of the card-control assembly 60 to move outward away from the stack 10. Since the selected card 10*a* is not held by the selector rods 33, centrifugal force will cause it to also move outward, as illustrated in FIG. 7, to the extent permitted by the projections 68 which remain engaged in slots 39 (see FIG. 4) of the selected card. It will be understood that since all the other cards in the stack 10 are held by at least one selector rod 33, they remain in the magazine, and only the selected card can move outward under the influence of centrifugal force. Sides 11*c* (FIG. 3) of the magazine 11 are disposed relatively close to the short edges of the cards so as to prevent an unselected card from pivoting, as might occur for cards which are held by only one selector rod.

By the end of the CARD MOVES OUT period, the card-control assembly 60 will have moved to its outermost position. At this position the selected card (which under the influence of centrifugal force continues to move outward to the extent permitted by the projections 68) will be completely free of the stack and will begin to fall downward as typically illustrated in FIG. 8. This part of the cycle is designated in FIG. 1 as the CARD ALL THE WAY OUT AND FALLING period. The purpose of this period is merely to provide time for the selected card to fall to a flat position once it is free of the stack, the groove 66 remaining essentially at its outermost radius throughout this period. To aid the fall of the selected card 10*a*, the upper portion 11*b* of the magazine 11 is appropriately curved downward so as to aid in driving the selected card towards a flat position, regardless of where the selected card comes out of the stack. Also, vacuum apertures 12*c* are provided at appropriate locations in the fixed base structure 12 (see FIGS. 1, 5 and 8) to speed up the fall of the selected card 10*a* to a flat position, and to maintain the card in a proper flat position during the transducing operation. It is to be understood that the fall of the card 10*a* could also be aided by providing apertures (not shown) in the curved top 11*d* of the magazine 11 through which air under pressure is suitably applied.

By the end of the CARD ALL THE WAY OUT AND FALLING period, the card will have reached a flat position (as indicated in FIGS. 1, 2 and 5) where it will be supported at its long edges by a lip 11*e* extending from the inner edge of the magazine 11, a shoulder 68*a* provided at the lower end of each projection 68, and a foot 11*f* (FIGS. 1, 5, 6 and 8) extending from the outer edge at one side of the magazine 11 and located so as to engage a slot 39*a* (FIGS. 1 and 3) in the selected card 10*a*. The fixed base structure 12 is disposed sufficiently below the selected card 10*a* when it is in its flat position (except for the transducing head 25 with which it is desired that the card make contact) so that there will be no wear on the card, the vacuum force provided through apertures 12*c* serving to aid the selected card to remain flat. In this connection, it will be noted (FIG. 1) that the vacuum apertures 12*c* at locations corresponding to the end of the CARD ALL THE WAY OUT AND FALLING period and the beginning of the TRANSDUCING OPERATION period are concentrated under the edges of the card in order not to unduly pull on the center of the selected card when it is in a flat position. It is to be noted that lip 11*e* is also provided with apertures as indicated at 11*g* (FIGS. 5 and 8) in order to permit the vacuum to act on the edge of the card when it is resting on the lip 11*e*.

In the next part of the cycle, which is designated in FIG. 1 as the TRANSDUCING OPERATION, the card which is now in a flat position will be carried over a transducing head 25 (as indicated in FIGS. 1, 2 and 5) for a transducing operation, the groove 66 remaining essentially constant at its maximum radius during this period. The transducing head 25 (which may typically be of the magnetic type) contains vacuum apertures 25*a* (FIG. 5) which are in addition to the apertures 12*c* provided in the base structure 12 and act in cooperation therewith to assure proper transducing contact between the card and the head as the card passes thereover.

After the TRANSDUCING OPERATION period, a CARD RETURNS TO BOTTOM OF STACK period begins (as indicated in FIG. 1) during which the groove 66 now decreases in radius relatively rapidly to its innermost position. This causes the projections 68 to drive the card inward towards the bottom of the stack 10 as illustrated in FIG. 9, the lip 11*e* being cut out as illustrated at 11*b* (FIGS. 1 and 6) to permit the projections 68 to move all the way to their innermost position.

Figure 9:
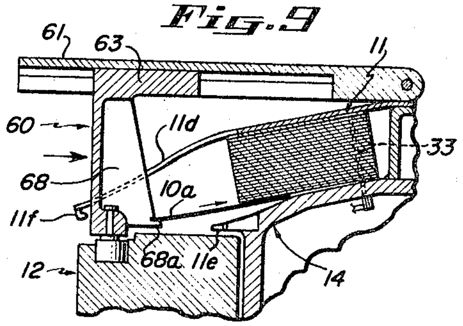

Also, the upper surface of the lip 11*e* is shaped (as illustrated in FIG. 9, for example) so that a sufficient space is provided between the lip 11*e* and the bottom of the stack 10 to permit the selected card to easily be driven by the projections 68 under the stack back onto the selector rods 33. It will be understood that the position of the bottom of stack 10 is determined in the first instance by the angle of the rods 33 and the magnitude of the centrifugal force and, as pointed out previously, these are chosen to optimize separation of a selected card from the stack.

Since the selector rods 33 remain in the position to which they were set during the CARD SELECTION period, the projections 68 (which always remain engaged with the slots 39 of the selected card) will be able to drive the selected card, during the CARD RETURNS TO BOTTOM OF STACK period, back onto the selector rods 33, the card being sufficiently stiff to prevent buckling. Thus, at the end of this CARD RETURNS TO BOTTOM OF STACK period, the card-control assembly 60 will be back in its initial innermost position (as previously illustrated in FIG. 6) with the projections 68 engaging the slots 39 of the selected card as well as the slots 39 of all the other cards in the stack.

It will be understood that while only a single stack 10 and its associated card-control assembly 60 have been described, operation of each of the other three stacks and their respective card-control assembly 60 during each rotational period is the same as just described. Consequently, three cards are accessed in the manner just described during each revolution, and FIG. 1 illustrates the location of a selected card 10*a* in each stack for the particular rotational position of the stack illustrated therein. FIG. 2 corresponds accordingly for the illustrated rotational position of each stack. It will be appreciated that if it is desired to operate the device so that an option is provided of having no card accessed from a stack during a particular revolution, this can be accomplished merely by providing the stack with one less card, and causing the respective selector rods 33 to select the absent card.

While the foregoing disclosure has been concerned with only a particular exemplary embodiment, it is to be understood that the invention is susceptible of many modifications and variations in both construction and arrangement. The present invention, therefore, is not to be considered as limited to the specific disclosure provided herein, but is to be considered as including all modifications and variations coming within the scope of the invention as defined in the appended claims.

What is claimed is:

1. In a device of the class described, a plurality of individual elements, means for retaining said elements as an assembled group and for selectively releasing an element for movement with respect to said group, means for rotating the assembled group of elements at a speed so as to generate a centrifugal force which will displace a selectively released element with respect to said group, a transducing means, means for applying a released element to said transducing means, and means for automatically returning a released element back to said assembled group after being applied to said transducing means.

2. In a device of the class described, a plurality of individual data-storage elements, means for retaining said elements as a plurality of assembled groups and for selectively releasing an element for movement with respect to its respective group, means for simultaneously rotating the assembled groups of elements at a speed so as to generate a centrifugal force which will displace a selectively released element from its respective group, a transducing means, means for applying a released element to said transducing means, and means for returning a released element back to its respective assembled group.

3. In a device of the class described, a plurality of individual elements, means for retaining said elements as an assembled group and for selectively releasing an element with respect to said group rotating means for rotating said assembled group to generate an accelerative force for causing a selected element therein to be urged away from the center of rotation, operating means, and a control assembly whose radial position controls the radial position of a selected element, said control assembly comprising means coupled to said rotating means to cause rotation of said control assembly at the same speed as said assembled group, means coupling a selected element to control the position to which it is urged by said accelerative force, and means coupled to said last-mentioned means for causing it to follow a path of varying radius with respect to the center of rotation, said path being chosen so as to permit a selected element to be displaced from said assembled group and transverse said operating means.

4. In a device of the class described, a plurality of individual elements, means for retaining said elements as an assembled group and for selectively releasing an element with respect to said group, rotating means for rotating said assembled group to generate an accelerative force for causing a selected element therein to be urged away from the center of rotation, and a control assembly whose radial position controls the radial position of a selected element, said control assembly comprising means coupled to said rotating means to cause rotation of said control assembly at the same speed as said assembled group, means coupling a selected element to control the position to which it is urged by said accelerative force, and means coupled to said last-mentioned means for causing it to follow a predetermined path of varying radius with respect to the center of rotation, said predetermined path being chosen so as to permit a selected element to be displaced from said assembled group during one part of a revolution and automatically returned to said assembled group by said assembly during a second part of a revolution.

5. A random access storage device comprising: a plurality of individual data-storage elements, means for retaining said elements as an assembled group and for selectively releasing an element with respect to said group, rotating means for rotating said assembled group to generate an accelerative force for causing a selected element in any position in said group to be urged away from the center of rotation, a control assembly whose radial position controls the radial position of a selected element, said control assembly comprising means coupled to said rotating means to cause rotation of said control assembly at the same speed as said assembled group, means coupling a selected element to control the position to which it is urged by said accelerative force, and means coupled to said last-mentioned means for causing it to follow a predetermined path of varying radius with respect to the center of rotation, said predetermined path being chosen so as to permit a selected element to be displaced from said assembled group during one part of a revolution and automatically returned to said group during a second part of a revolution, and a transducing means located so that a selected element is applied thereto for a transducing operation when it is displaced from said assembled group.

6. In a device of the class described, a plurality of individual coded card elements, means for retaining said elements as an assembled group, means for cooperating with the coding on said elements for selectively releasing an element for movement wtih respect to said group from any position therein, rotating means for rotating the assembled group of elements so as to generate an accelerative force which will urge a selected element away from the center of rotation, a control assembly whose radial position controls the radial position of a selected element, said control assembly comprising means coupled to said rotating means to cause rotation of said control assembly at the same speed as said assembled group, means coupling a selected element to control the position to which it is urged by said accelerative force, and means coupled to said last-mentioned means for causing it to follow a predetermined path of varying radius with respect to the center of rotation, said predetermined path being chosen so as to permit centrifugal force to displace a selected element from said assembled group during one part of a revolution and cause said control assembly to automatically return the displaced element to said group during a second part of a revolution, a transducing means located so that a selected element is applied thereto for a transducing operation when it is displaced from said assembled group.

7. A random access storage device comprising: a plurality of individual data-storage elements, means for retaining said elements in a plurality of assembled groups and for selectively releasing an element for movement with respect to its respective group from any position therein, means for simultaneously rotating the assembled groups of elements so as to generate an accelerative force which will urge a selected element away from the center of rotation, a control assembly for each group whose radial position controls the radial position of a selected element therein, means for simultaneously rotating each central assembly along with its respective group, each control assembly comprising means coupling a selected element to control the position to which it is urged by said accelerative force, and means coupled to said last-mentioned means for causing it to follow a predetermined path of varying radius with respect to the center of rotation which is the same path for all control assemblies, said predetermined path being chosen so as to permit centrifugal force to displace a selected element from its respective assembled group during one part of a revolution and cause its respective control assembly to automatically return the displaced element to its respective group during a second part of a revolution, and a transducing means located so that a selected element is applied thereto for a transducing operation when it is displaced from its respective assembled group.

8. A random access storage device comprising: a plurality of individual data-storage cards arranged in a stack with their flat portions horizontal, means for rotating said stack around a vertical axis, means for retaining said cards and for releasing a selected one thereof regardless of its position in the stack for movement away from the center of rotation under the influence of the centrifugal force produced by rotation of said stack, a card-control assembly whose radial position controls the radial position of a selected card, said card-control assembly rotating with said stack while following a path of varying radius with respect to the center of rotation, the construction and arrangement of said card-control assembly and the manner of variation of the radius thereof being chosen so as to permit a selected card to be separated from said stack by centrifugal force and to fall to a flat transducing position during a predetermined portion of a revolution while still being maintained rotating along with said stack, and a fixed transducing means located so that a selected card which has fallen to said transducing position will traverse said transducing means for a transducing operation, said card-control assembly and the varying radial path thereof being further chosen so that a selected card in said transducing position will be driven by said card-control assembly back onto the bottom of said stack.

9. The invention in accordance with claim 8, wherein said cards have coded notches on their edges closest to the center of rotation, and wherein selector rods are provided cooperating with said coded notches so as to permit release of a selected card under the influence of centrifugal force regardless of its position in the stack.

10. The invention in accordance with claim 8, wherein pneumatic means are additionally provided to aid the fall of a selected card to its transducing position and to maintain the card in its transducing position during a transducing operation.

11. The invention in accordance with claim 8, wherein each card has notches in its edge farthest from the center of rotation, and wherein said card-control assembly has projections constructed and arranged to engage the notches of a selected card so as to control the radial position thereof in accordance with the radial position of said card-control assembly.

12. The invention in accordance with claim 11, wherein a magazine is provided within which the cards of a stack are retained at their edges closest to the center of rotation with the cards sloping downward away from the center of rotation so as to be at an optimum angle for release of a selected card by centrifugal force, and wherein the lower surface of said magazine is shaped with respect to the stack in its normal rotating position so as to leave sufficient room for said card-control assembly to return a selected card to the bottom of the stack.

13. The invention in accordance with claim 12, wherein the upper surface of said magazine is directed downward so as to guide a selected card towards a transducing position.

14. The invention in accordance with claim 12, wherein said projections are provided with a shoulder at their lower end and the lower surface of said magazine is provided with a lip at its lower end so that the edges of a selected card will be carried thereon when the selected card is in a transducing position.

15. The invention in accordance with claim 11, wherein said rotating card-control assembly has a radially variable follower member rigidly affixed to said projections, and wherein a fixed base structure is provided having a variable radius groove in which said follower member rides, the radius of said groove controlling the radial position of said follower member which in turn controls the radial position of a selected card.

16. The invention in accordance with claim 11, wherein a rotating structure is provided, and a plurality of stacks having a plurality of respective card-control assemblies are symmetrically affixed to said rotating structure so as to rotate therewith, the follower member of each card-control assembly riding in said groove, whereby a plurality of cards, one from each stack, may be caused to traverse said transducing means for each rotation of said rotating structure.

References Cited by the Examiner

UNITED STATES PATENTS

| | | | |
|---|---|---|---|
| 2,602,451 | 7/1952 | Hofgaard | 129—16.1 |
| 2,722,676 | 11/1955 | Begun | 340—174.1 |
| 2,908,278 | 10/1959 | Goerlich | 129—16.1 |
| 3,092,114 | 6/1963 | Jonker | 129—16.1 |
| 3,105,593 | 10/1963 | Fredkin | 129—16.1 X |

JEROME SCHNALL, *Primary Examiner.*